(12) United States Patent
Shekarriz et al.

(10) Patent No.: US 7,258,716 B2
(45) Date of Patent: Aug. 21, 2007

(54) MICROIMPACTOR SYSTEM HAVING OPTIMIZED IMPACTOR SPACING

(75) Inventors: Alireza Shekarriz, Lake Oswego, OR (US); Danielle Lynn Taylor, Portland, OR (US); Joseph Gerard Birmingham, 768 N. Shore Rd., Lake Oswego, OR (US) 97035

(73) Assignee: Joseph Gerard Birmingham, Vancouver, WA (US)

( * ) Notice: Subject to any disclaimer, the term of this patent is extended or adjusted under 35 U.S.C. 154(b) by 62 days.

(21) Appl. No.: 10/805,791

(22) Filed: Mar. 22, 2004

(65) Prior Publication Data

US 2005/0204712 A1    Sep. 22, 2005

(51) Int. Cl.
*B01D 45/08* (2006.01)

(52) U.S. Cl. .................. 55/442; 55/443; 55/444; 55/524; 55/315; 55/463; 55/DIG. 25; 55/DIG. 39

(58) Field of Classification Search .................. 55/442, 55/443, 444, 524, 315, 463, DIG. 25, DIG. 39
See application file for complete search history.

(56) References Cited

U.S. PATENT DOCUMENTS

| | | | | |
|---|---|---|---|---|
| RE33,444 E | * | 11/1990 | Lerner | .................. 95/221 |
| 4,992,085 A | * | 2/1991 | Belin et al. | .................. 55/444 |
| 6,010,554 A | * | 1/2000 | Birmingham et al. | .......... 95/32 |
| 6,051,041 A | * | 4/2000 | Wurz et al. | .................. 55/315 |
| 6,062,392 A | | 5/2000 | Birmingham et al. | |
| 6,110,247 A | | 8/2000 | Birmingham et al. | |
| 6,120,573 A | * | 9/2000 | Call et al. | .................. 55/442 |
| 6,156,212 A | | 12/2000 | Rader et al. | |
| 6,270,558 B1 | | 8/2001 | Theiler | |
| 6,432,630 B1 | | 8/2002 | Blankenstein | |
| 6,454,824 B1 | * | 9/2002 | Maryamchik et al. | ..... 55/434.4 |
| 6,465,225 B1 | | 10/2002 | Fuhr et al. | |
| 6,467,630 B1 | | 10/2002 | Zborowski et al. | |
| 6,488,900 B1 | | 12/2002 | Call et al. | |

OTHER PUBLICATIONS

"Generating Particle Beams of Controlled Dimensions and Divergence: I. Theory of Particle Motion in Aerodynamic Lenses and Nozzle Expansions", Aerosol Science and Technology, vol. 22, No. 3, pp. 293-313 (1995).
"Generating Particle Beams of Controlled Dimensions and Divergence: II. Experimental Evaluation of Particle Motion in Aerodynamic Lenses and Nozzle Expansions", Aerosol Science and Technology, vol. 22, No. 3, pp. 314-324 (1995).
"Virtual Impactors: A Theoretical Study", Environmental Science & Technology, vol. 14, No. 8, pp. 976-985 (1980).

* cited by examiner

*Primary Examiner*—Minh-Chau T. Pham
(74) *Attorney, Agent, or Firm*—Gary C Cohn, PLLC

(57) ABSTRACT

A microimpactor device for separating particles from a fluid stream includes a plurality of microimpactor in a two-dimensional array. Individual microimpactors are separated by a distance of about 3 to 20 times the microimpactor width. This spacing provides a device that operates well at low pressure drops across the device. Particles borne in a fluid stream tend to accumulate on both the front and rear sides of the microimpactors, thereby increasing the efficiency of the device.

10 Claims, 1 Drawing Sheet

Figure
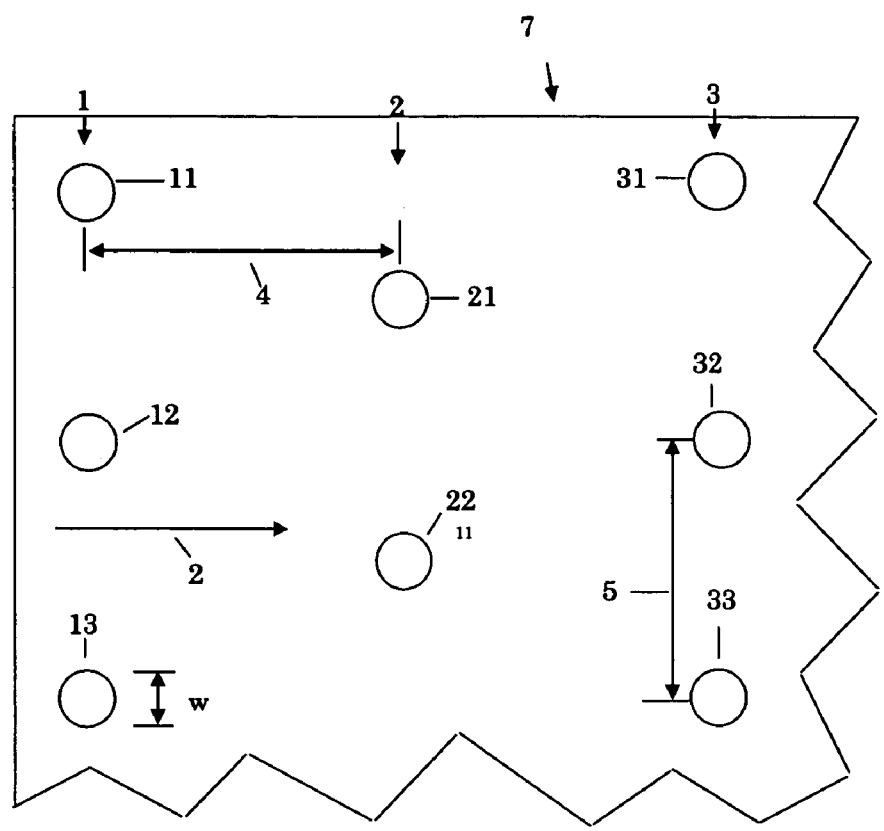

MICROIMPACTOR SYSTEM HAVING OPTIMIZED IMPACTOR SPACING

BACKGROUND OF THE INVENTION

This invention relates to apparatus and methods for separating particulate matter (solid particles and/or liquid droplets) from a fluid stream.

It is often desirable to remove particulate matter from a fluid stream. For example, it may be desired to simply cleanse the fluid of the particulate matter, or at least reduce the concentration of the particulate matter in the stream. In other instances, the goal is to capture a certain size range of particulate matter for analysis and/or characterization. Sometimes, the aim is to simply concentrate the particulate matter so that it can be used in some way.

A large number of devices exist for this purpose. These include various types of filters, cyclones, electrostatic precipitators, among other devices. For removing very small particulate matter, such as aerosol particles and microorganisms, from a gas stream, various types of virtual cyclones and virtual impactor devices have been devised. Examples of these are described in U.S. Pat. Nos. 6,156,212 and 6,386,015 (micromachined virtual impactor), U.S. Pat. No. 6,432,630 (micro-flow system using an external field to deflect particles), U.S. Pat. No. 6,270,558, U.S. Pat. No. 6,465,225 (centrifugal- or gravity-fed deflection system); U.S. Pat. No. 6,467,630 (column with applied "convective force"); and U.S. Pat. No. 6,062,392 (virtual impactor).

In many applications, it is necessary to perform the separation of particulate matter using small, lightweight apparatus that operates simply and requires minimal energy. In many devices, an efficient separation can be performed only if there is a high pressure drop through the device, or if some other energy (such as to create an external, particle-deflecting field) is applied. To address this problem, U.S. Pat. No. 6,110,247 describes a micropillar device which relies on an array of micropillar rows to capture particles from a fluid stream. The micropillar device provides separation of particulate matter at moderate pressure drops, while still allowing for recovery of the captured particulate matter.

However, it is desirable to obtain further improvements in separation efficiency. In particular, it is desirable to operate under lower pressure drops than exhibited with the micropillar device of U.S. Pat. No. 6,110,247. In addition particle capture efficiency with such micropillar devices is often less than desirable, because particles tend to bounce off of micropillar surfaces (in part due to high impact velocities). Thus, particles colliding with the micropillar surfaces tend often are able to nonetheless pass through the device and avoid collection.

SUMMARY OF THE INVENTION

In one aspect, this invention is a microimpactor system comprising a fluid conduit having a plurality of rows of microimpactors arranged in the fluid conduit substantially transverse to a main direction of flow of fluid through the fluid conduit, wherein the spacing between adjacent microimpactors within a row is from about 3 to about 20 times the microimpactor width, and the spacing between adjacent rows of microimpactors is from about 3 to about 20 times the microimpactor width.

It has unexpectedly been found that the spacing between adjacent microimpactors, both within a single row and between adjacent rows, has a very significant impact on the collection efficiency of the device. In particular, the spacing specified herein allows the microimpactor system to operate very efficiently at lower pressure drops than the micropillar system described in U.S. Pat. No. 6,110,247. Additionally, it has been found that the specified microimpactor spacing often enables a far greater proportion of particles within the desired size range to be collected, for a given number of microimpactors within the array, than the micropillar system of U.S. Pat. No. 6,110,247. As discussed more fully below, this effect is believed to be due to (1) lesser acceleration of the fluid as it passes between adjacent microimpactors and (2) the existence of quiescent zones downstream from each microimpactor, which allow for particle collection to occur on the downstream side of the microimpactors. The spacing described herein also provides advantages in interrogating the system for analysis of the captured particles, and in cleaning and/or recovering captured particles.

BRIEF DESCRIPTION OF THE DRAWING

The FIGURE is a top view of a portion of a microimpactor array having microimpactor spacing in accordance with the invention.

DETAILED DESCRIPTION OF THE INVENTION

Microimpactor systems of the general designs described in U.S. Pat. No. 6,110,247 to Birmingham et al. and copending United States patent application of Faulkner et al., entitled "Microimpactor System for Collection of Particles From a Fluid Stream", filed on even date herewith, are useful herein (both incorporated herein by reference), provided that such designs are so modified as to provide the inter-impactor spacing described herein. In general, the microimpactor system includes a plurality of microimpactors arranged into a series of rows to form a two-dimensional array. The microimpactor system can be produced from a single piece of material, as described in U.S. Pat. No. 6,110,247, using, for example, micromachining or deep ion etching methods. Preferably, the microimpactor system is made using a sheet architecture approach described in the copending application of Birmingham et al. described above. In the sheet architecture approach, rows of microimpactors are defined by a series of openings in a sheet. Sheets are stacked, optionally with spacer devices, to create a two-dimensional array of micrimpactors, wherein each microimpactor sheet defines one row of microimpactors within the array.

The microimpactors can be made in a variety of manufacturing process, which may depend somewhat on the material(s) of construction. Micromachining, photo-chemical etching, embossing, lithographic galvanic anodization (LIGA), lamination, injection molding, deep reactive ion etching (DRIE) and other fabrication methods can all be used. Of particular interest are photo-chemical etching and DRIE methods, as these can allow for rapid, inexpensive manufacture of microimpactor sheets with very good precision.

The spacing of the micropillars is important, and can be understood by reference to the FIGURE. In the FIGURE, a section of a microimpactor array 7 is illustrated in a top view. Microimpactors are arranged in rows 1, 2 and 3, that are oriented transverse to the main direction of fluid flow through microimpactor array 7, which is indicated by arrow 2. Microimpactors 11, 12 and 13 are arranged to form row 1, microimpactors 21 and 22 are arranged to form row 2 and microimpactors 31, 32 and 33 are arranged to form row 3. Of course, any greater number of microimpactors may be used in any row.

As shown, microimpactors 11, 12, 13, 21, 22, 31, 32 and 33 are of uniform width, which is indicated as w in the FIGURE. The width of a microimpactor is defined determined transverse to the main direction of fluid flow through the device. Microimpactor spacing within each of rows 1, 2 and 3 is approximately uniform as shown, the intra-row spacing being indicated by double-headed arrow 5. Spacing between rows is also approximately uniform as shown, and is indicated by double-headed arrow 4. Both inter-row and intra-row spacing is determined from the center of one microimpactor to the center of the adjacent microimpactor, as indicated.

Inter-row spacing in this invention is from about 3 to about 20 times the microimpactor width. Inter-row spacing may be between 3 and 10 times the microimpactor width and may be between 5 and 8 times the average microimpactor width. Intra-row spacing is also from about 3 to about 20 times the microimpactor width, and may also be between 3 and 10 times the microimpactor width or between 5 and 8 times the microimpactor width. Microimpactor widths are in general from about 1 to about 4,000 microns wide, preferably from about 10 to 400 microns wide, especially from about 10 to about 150 microns wide, more preferably from about 10 to about 100 microns wide. On an absolute basis, inter-and intra-row spacings of the microimpactors are both advantageously from about 3 to 10,000 microns, especially from about 20 to about 1000 microns, especially from about 30 to about 300 microns.

This spacing is particularly useful for capturing 1–10 micron particles, suitably at flow rates of 200–300 liters per minute through the device.

It is not necessary that the width of all microimpactors (either within a single sheet or within the array) be uniform, or that the spacing between them be uniform. If differing microimpactor widths are used, the inter-and intra-row spacing between microimpactors of differing widths is determined on the basis of the narrowest of such microimpactors.

The height of the microimpactors is generally not critical, and will typically be chosen to provide the desired cross-sectional area to the fluid conduit. Suitable microimpactor heights can range from about 1 micron to about 50 millimeters or more, and preferably from about 500 microns to about 15 millimeters and more preferably from about 1 to 10 millimeters. Microimpactors can be stacked within a fluid conduit if desired, to provide greater overall height and thus increase cross-sectional area.

Although the invention is illustrated with the microimpactors arranged in straight rows, this is not critical, and the microimpactors may assume a number of nonlinear configurations, including forming curved or even circular or elliptical rows. An embodiment of particular interest includes multiple micropillar rows that form a series of concentric circles, polygons, ellipses or other shapes. The direction of fluid flow in such an embodiment is either from the center of the concentric rows radially outward, or from the periphery of the concentric sheets radially inward.

The microimpactors can be made from a wide variety of materials, the choice of which may depend on the particular application in which they will be used. For example, the microimpactors may be made of a metal, a ceramic material, glass, thermoplastic or thermoset polymer, a rubber (synthetic or natural), a semiconductor material, or a combination of these materials. Different microimpactors in the array may be made of different materials. This may be desirable if, in the particular application, two or more different types of particles are to be removed from the fluid stream. The microimpactors may be substantially solid or may contain pores. Pores may be from the nano-scale up to 1 micron or more, of course depending somewhat on the dimensions of the microimpactor as a whole and the desired application.

Specific microimpactor materials of construction will of course be selected for specific applications. If the microimpactors are to be charged, the material of construction is conveniently a metal or other conductive material. In cases where the microimpactors are to be heated (such as to lyse or deactivate captured biological particles), the microimpactors are conveniently made from an electrical resistor that converts electrical energy to heat. The microimpactors may be made from a semiconductor such as silicon, and the semiconductor may include printed electrical circuitry that allows voltages to be applied to the microimpactors (for example, to apply a charge or generate heat), or electrical signals to be transmitted from the microimpactors for monitoring or analysis. The microimpactors may be a laminate or layered material.

In many applications, the microimpactors will function simply as a physical barrier to the movement of the particles through the microimpactor array, and as such the particular material of construction may not be especially important. However, there are many applications in which it is desirable that the microimpactors interact with the particles in some manner beyond presenting a simply physical barrier. In those instances, the composition of the microimpactors, or at least that of the surfaces of the microimpactors, are desirably prepared from a substance that will interact with the particles in the desired manner. To this end, the surfaces of the microimpactors may be treated or coated in various ways to promote the desired type of interaction between particle and microimpactor surface. Coatings such as this are preferably very thin, in the order of about 1 angstrom to 100 nm in thickness, so as not to significantly change the microimpactor dimensions.

Examples of interactions of this type include enhanced adhesion, decreased adhesion (for example, to facilitate cleaning), electrostatic attraction and/or repulsion, adsorption, deactivation, oxidation and/or reduction, lysing, catalysis, identification reactions, polymerization, other chemical reactions, analysis, and the like.

For example, the microimpactors may be coated with an adhesive so that the particles adhere better to the microimpactors and are more efficiently removed from the fluid stream. A wide range of adhesives is suitable. A particularly suitable type of adhesive is one that will release the particles when desired, such as by wetting, so the particles can be recovered and/or the microimpactor system cleaned. A particular adhesive that loses tack when wet is available from the Washington Technology Center, Seattle, Wash., under the trade name Tetraglyme™.

Alternatively, the microimpactors may be made from or coated with a non-stick material, such as a fluorinated polymer like Teflon™ fluoropolymer or Paralene™ polymer material (available from EM Corporation, Peachtree, Ga.) to enhance removal and/or recovery of the particles.

The microimpactors can be charged in order to electrostatically attract and bind the particles, and/or to deactivate or decompose the particles. In such a case, the microimpactors are advantageously made of, doped with or coated with a conductive or semiconductive material, which is in electrical connection to an electrical power source that supplies the necessary charge. An electrostatic attraction to the particles can be increased by applying an electrostatic charge to the particles themselves, at some point prior to passing the particle-laden stream through the microimpactor array. In such an embodiment, the particle-laden fluid is caused to flow through such a spray zone, and then into the microimpactor system, which is directly or indirectly in fluid communication with the spray zone. The spray zone includes a conduit for the particle-laden fluid and an apparatus for forming electrostatically charged droplets and spraying them into the fluid stream where they contact the particles. Atomizers of various types are known and are suitable. Examples of such sprayers include those described in U.S. Pat. Nos. 4,255,777, 4,439,980, 4,784,323, 5,062,573, 5,378,957, 6,227,465, 6,318,648 and WO 01/21319A1, all incorporated herein by reference. A particular preferred type of atomizer is described in US Published Patent Application 2003/0071134A1, incorporated herein by reference. That atomizer includes (A) at least one microinjector including (1) an orifice through which the liquid is brought in contact with a pin emitter and (2) a conductive pin emitter extending outwardly from said orifice, the pin emitter having a radius of curvature in at least one location external to said orifice of no greater than 500 µm; B) means for introducing the liquid to be atomized through the orifice and to the pin emitter, and C) means for connecting said pin emitter to a voltage source. The liquid is preferably under a hydrodynamic pressure of 5 inches of $H_2O$ or less.

Other materials of construction or coatings for the microimpactors include various types of materials that decompose and/or deactivate the particles, catalyze their decomposition and/or deactivation, catalyze some other reaction of the particles with themselves or other materials (including the microimpactors themselves), or else react directly with the particles. A wide range of such materials is possible, depending on the specific application. Deactivation and/or decomposition are particularly desirable in the case where the particles are pathogenic and/or toxic. In that case, the microimpactor surface can include, for example, a strong oxidant or reducing agent, or a toxin for the particles (in the case of a biological material). An example of such a deactivating agent is a platinum-on-alumina catalyst, which has been developed as an air purification catalyst for use against nerve agents. If the fluid sample is thought to contain multiple types of pathogenic and/or toxic agents, different microimpactors can be treated with different coatings, or made of different materials, each of which will deactivate and/or decompose a specific type of suspected pathogenic or toxic agent. Alternatively, different portions of individual microimpactors can be made of different materials for the same purpose.

Yet other materials of construction or coatings for the microimpactors include antibodies, ligands and membrane materials, which can perform, for example, enhanced particle capture, identification, inactivation, catalytic and/or reagent functions.

The microimpactor may be made of or include a piezoelectric material, if desired, so that controlled movement and/or physical distortion of the microimpactors can be caused through the application of an electrical current.

Microimpactors may be connected to electrical circuitry through various types of edge connector devices. Electrical circuitry includes, for example, connections to sources of electrical power and various kinds of detection and/or analytical devices.

Particles are removed from a fluid stream by flowing a particle-laden fluid through the fluid conduit in a main direction of flow transverse to the orientation of the microimpactors. The rows of microimpactors define a tortuous flow path through the fluid conduit, forcing the fluid (and particles) to change direction multiple times as it flows through the conduit. The particles have greater inertia than the fluid, due to their high mass (relative to that of the fluid molecules), and therefore tend to negotiate the changes in direction more poorly than the fluid. This causes the particles to impact and adhere to the microimpactors. In this manner, particles are removed from the fluid as it flows through the fluid conduit.

Captured particles often form extended "dentrite" structures by accumulating on the microimpactors in the form of "strings" of captured particles. This effect is often enhanced when an electrostatic charge is applied to the microimpactors (and optionally the particles to be captured). These dentrites extend from the surface of the microimpactors and often have the effect of increasing the ability of the microimpactors to capture more particles, thereby increasing the overall efficiency, with little or no corresponding increase in pressure drop.

Fluid flow through the microimpactor system may be provided by applying fluid pressure upstream of the system, by drawing a vacuum downstream of the system, or by ion wind generation (which may be effected by applying a charge to the microimpactor system). A variety of fans, micropumps and other devices may be used either upstream or downsteam of the microimpactor system to effect the flow. These may be incorporated in fluid communication with the microimpactor system in a single device. For certain applications, such as personal protection devices, the requisite fluid flow can be produced through the inhalation or exhalation of an individual using the device. The microimpactor system can generally operate under relatively low pressure drops, such as <500 Pascals and especially less than about 100 Pascals, such as from about 10 to about 100 Pascals.

Fluid flow through the microimpactor system may also be achieved through movement of the microimpactor relative to the fluid, such as, for example by rotating the microimpactor system to obtain centrifugal movement of the fluid, or by moving the microimpactor system laterally through a fluid.

The microimpactor array can be designed to operate at a wide variety of flow rates, depending on application. However, because of the low pressure drop afforded by the microimpactor array, it is particularly of interest in applications involving low to moderate pressures across the device.

The efficiency of the particle removal, and the size and the size of the particles that are collected, are functions of various factors, including flow rates, microimpactor widths and spacing, spacing between rows of microimpactors, the mass of the particles, the mass of the fluid molecules, and the viscosity of the fluid (which may be negligible when the fluid is a gas, as is preferred), the surface properties of the microimpactors, the presence or absence of electrostatic charges, and other factors.

Although the invention is not limited to any theory, it is believed that the microimpactor system of the invention provides for improved particle capture due to the enhanced inter- and intra-row spacings. When the individual microimpactors are closely spaced, fluid flow accelerates in the narrow passages between microimpactors. Increasing the spacing causes less of this acceleration, at constant pressure drops across the device. The decreased acceleration is believed to have several beneficial effects. Because fluid flow rates are decreased, particles impact the front side (i.e., that facing the incoming fluid) of the microimpactors less violently, and are less prone to rebound back into the flowing fluid and be washed away. Lower acceleration also means that there is less turbulence within the fluid at the front surface of the microimpactors, which enables captured particles to remain in place better without being washed back into the fluid flow. In addition, the lower fluid accelerations create relatively quiescent zones downstream of the microimpactors. It is believed that a so-called "vortex shedding" phenomenon occurs in these regions. Particles entering these regions can be captured, even though these regions are downstream of the microimpactor, as the particles will tend to accumulate in regions of quiescent flow. Accordingly, particles are frequently seen to accumulate on the downstream surfaces of the microimpactors, and on the upstream surfaces as well. This leads to increased particle capture that compensates for the few number of microimpactors per unit area. In addition, the increased spacing allows the device to operate at lower pressure drops.

In this invention, a "fluid" is considered to be any material capable of fluid flow, including gasses, liquids, molten materials, and the like. The invention is particularly useful for removing particles from gasses, including air, nitrogen, oxygen, argon, helium, hydrogen, hydrocarbons, carbon dioxide, chlorocarbons, fluorocarbons, chlorofluorocarbons, various mixtures of gasses and the like.

"Particles", in the context of this invention, include both solid particulate matter, as well as liquids that exist as discrete droplets within the fluid stream. To be separable, the particles need to have mass that is significantly greater than that of the molecules of the carrier fluid. The greater inertia of the particles causes them to change direction more slowly than the molecules of the carrier fluid. Particles having a longest dimension of from about 0.01–100 microns, especially from about 0.1 to about 100 microns, are particularly suitable for removal from a gaseous carrier fluid using this invention.

The composition of the particles is generally unimportant to the operation of the invention. The particles may include various types of biological matter such as bacterial spores, viruses, other microorganisms and pollen, and may include pathological agents such as anthrax or smallpox spores. The particles may include other chemical aerosols of all types, including those which have toxological properties. The particles may include inorganic or other organic particulate matter or droplets, such as water droplets, smog particles, smoke particles, dust particles, mineral particles, metal particles, and the like.

Captured particles and absorbed may be removed from the microimpactor array using various methods, such as the application of heat (to degrade, volatilize or combust the particles), by backwashing with a fluid flow in the reverse direction, flushing with solvents, removal or reversal of an applied electrostatic charge, various mechanical methods such as brushing, wiping, washing and the like, as well as other methods. Removed particles can be disposed of, taken for analysis, or used for various purposes as desired.

The microimpactor system of the invention can be used as a stand-alone device or combined with various other components to form an assembly that is adapted for specific applications. Examples of specific applications and devices that incorporate the microimpactor sytem are described below. Other uses for the microimpactor system are described, for example in U.S. Pat. No. 6,110,247, incorporated hereinb by reference.

A. Simple particle filtration. In these applications, the microimpactor system operates simply to capture particles to remove them from the fluid, primarily for cleaning purposes. The captured particles may be removed from the microimpactor system if desired, so that the microimpactor system can be re-used. Alternatively, the used microimpactor system (or individual microimpactors) may be disposed of along with the captured particles and replaced as needed. The microimpactor system can be incorporated into various devices to be used in filtration applications. The devices can include, for example, means as described before, in fluid communication with the microimpactor system, for creating a flow of the fluid through the microimpactor system; means for applying an electrostatic charge to the microimpactor system or some portion thereof, means for applying an electrostatic charge to the particles; an optional prefilter or postfilter in fluid communication with the microimpactor system for removing larger or smaller particles that are not captured by the microimpactor system, an optional means to pre-sort incoming particles by size or to remove the bulk of the particles; a fluid inlet and fluid outlet to the device, and optionally means for accessing the microimpactor device for replacement, maintenance and/or cleaning. Such accessing means include, for example, various types of openings, which may be reclosable, through which the microimpactor device can be removed from the device and/or manipulated, cleaned or repaired.

Similarly, the microimpactor system can used as a pre- and/or postfilter in a device that includes at least one other filtration device, such as a screen, a virtual impactor, or an inertial separator. In pre-filtration applications, the microimpactor can remove particles of a pre-determined size that may be too small or two large to be captured efficiently by the main filtration device. A device in which the microimpactor system functions as a pre- or postfilter includes, in fluid communication, a fluid inlet, a main filtration device, a fluid outlet, at least one microimpactor system located upstream (in the case of a prefilter) and/or downstream (in the case of a postfilter) of the main filtration device and optionally at least one means for creating a flow of the fluid through the device. The device may contain means to electrostatically charge the microimpactors and/or the particles.

In post-filtration applications, the microimpactor can be used to capture particles that are not collected by the main filtration device, or as a sensor or a component of a sensor that indicates the condition and/or remaining useful life of the main filter. As the main filter ages or becomes laden with captured particles, its openings can become almost entirely blocked. This causes the pressure drop across the filter to increase and the volume of particles passing through the filter to decrease. Conversely, aging or dirty filters often develop defects that allow particulate matter to pass through that would otherwise be captured. The rate at which particles are captured by the post-filter is therefore indicative of the condition of the main filter. This rate may be determined visually by simply inspecting the microimpactor post-filter system, by removing the microimpactor system for remote analysis, or by conducting an in situ analysis of collected particles.

B. Particle recovery. Captured particles can be recovered for analysis or use using a variety of particle recovery techniques such as described above. Devices adapted for such applications are typically similar in design to those used for filtration applications, and include in fluid communication, a fluid inlet, a main filtration device, a fluid outlet, at least one microimpactor system and optionally at least one means for creating a flow of the fluid through the device. The device may contain means for electrostatically charging the particles and/or the microimpactors. Devices for particle recovery applications preferably include means for accessing the microimpactor device for analysis, replacement, maintenance and/or cleaning, as described before.

C. Particle classification. In these applications, the microimpactor system is used, in conjunction with other microimpactor systems, or in conjunction with other particle separation devices, to sort particles by, for example, size, weight, shape, composition or other characteristics. In the simplest application, a single microimpactor system (or two or more like microimpactor systems) removes particles having one or more predetermined characteristics from a fluid stream, while allowing particles that do not have such characteristic(s) to pass.

Multiple microimpactor systems can be used in series or parallel to classify and capture particles having different characteristics. In such cases, two or more of the microimpactor systems will differ from each other in some manner that allows each of them to selectively remove particles having different characteristics from the fluid stream. For example, a particle classification device may contain a first microimpactor system that captures particles of a first size range, and a second microimpactor system that captures particles of a smaller or larger size range. The two microimpactor systems are preferably arranged in series and in fluid communication with each other, with the device having a fluid inlet upstream of the microimpactor systems and a fluid outlet downstream of the microimpactor systems.

Alternatively, a particle classification device may contain a first microimpactor system that is electrostatically charged, and thus captures electrostatically charged particles. The device will include means for applying an electrostatic charge to the microimpactors. Such a device optionally includes means for introducing an electrostatic charge onto the particles, preferably located upstream of the microimpactor system. Suitable devices for introducing an electrostatic charge are described in various references mentioned above.

A particle classification device can alternately include a microimpactor system that has surface characteristics that enable it to preferentially capture particles that chemically interact with the microimpactor surface. A second microimpactor system is then provided to capture other particles that are not collected by the first microimpactor system. The second microimpactor system will typically include a different geometrical arrangement of the microimpactors.

In other embodiments, the microimpactor system is used in combination with other particle separation and/or capture devices to sort particles according to predetermined characteristics. Examples of such other separation and/or capture devices include virtual impaction particle collectors, acoustic concentrator devices, and other types of particle collection and separation devices as described before. These devices may be used upstream of the microimpactor device to sort out particles that, for example, are larger or smaller than those of interest, and to concentrate the particles for capture on the microimpactor system.

D. Particle Analysis and/or Detection. In these applications, captured particles are subject to one or more analytical techniques to determine physical, chemical and/or biological attributes, or to indicate the presence of certain types of particles. Post-capture particle analysis or detection can be performed after removing the collected particles from the microimpactor system, or on the particle-laden microimpactor system. In the latter case, particle analysis or detection can be done performed in-line and continuously, if desired.

The particular analytical or detection technique to be used will of course depend on the particles and the nature of the evaluation. Collected particles may be removed from the microimpactor system if desired or necessary using techniques as set forth above.

For in-line particle analysis and detection, the microimpactor system and collected particles may be interrogated using a variety of sensing techniques, including visible and/or UV fluorescence, tetrahertz spectroscopy, Raman spectroscopy, IR spectroscopy, mass spectroscopy, MALDI-MS and the like. In these applications, it is preferred that the microimpactors are transparent to the particular sensing device, or else distinguishable from the captured particles by that particular sensing device. The microimpactor may instead be made from or coated with various types of reagents, probes or biological materials such as ligands or antibodies, which engage in a chemical reaction or bond to specific types of particles and thereby indicate the presence of those particles in the fluid.

Thus, a particle analyzer according to an aspect of the invention includes one or more microimpactor systems, a fluid inlet and fluid outlet to the device in fluid communication with the microimpactor system, and at least one analytical device adapted to interrogate the microimpactor system for detection and/or analysis of captured particles. Such a particle analyzer may contain various optional but preferred features as have been described before with respect to other applications, including, for example, circuitry for powering and operating the analytical device and for obtaining data from the analytical device and converting it to human-readable form; various types of readouts and displays; means for creating a flow of the fluid through the microimpactor system; an optional prefilter or postfilter in fluid communication with the microimpactor system for removing larger or smaller particles that are not captured by the microimpactor system, an optional means to pre-sort incoming particles by size or to remove the bulk of the particles; and optionally means for accessing the microimpactor device for replacement, maintenance and/or cleaning. If desired, the entire particle analyzer can be mounted onto an integrated circuit board or other device, in order to integrate particle collection and detection/analysis. The analytical device can be of various types as described in the preceding paragraph.

A particle detection device according to the invention is of similar design, except that instead of or in addition to the analytical device, reagents, probes or biological materials such as ligands or antibodies are present on the surface of the microimpactors to indicate the presence of specific types of particles in the fluid.

In another type of detector device, microimpactors are made from an optically transparent material such as quartz that is coated with a nuclear detection material (such as copper or nanoporous copper) that generates photons when it detects a particular material of interest. The microimpactor is connected to a fiber optic material that transmits the generated photon to a collector. The circuitry may include a filter, that allows only photons of a desired wavelength to pass (to remove noise or signals from species that are not of interest) and a photomultiplier to increase the signal.

E. Particle lysing, deactivation, catalysis and chemical reactions. Particles captured by the microimpactor system can be subjected to a wide variety of operations, examples of which are lysing, deactivation, catalysis, and various chemical reactions such as oxidation or polymerization. This can be accomplished in several ways. Captured particles may of course be recovered from the microimpactor system and treated. The microimpactors themselves may be made from, be coated with or otherwise contain an agent that reacts with the captured particle to accomplish the desired operation. Alternatively, the particle-laden microimpactors may be exposed to an agent which accomplishes that operation. The microimpactors may also conduct electrical or thermal energy to the captured particles for performing lysing, other electrochemical reactions or thermal degradation of captured particles.

A specific example of the foregoing is the deactivation of toxic chemical and biological agents and pathogens. In many military and civilian applications, it is necessary to protect individuals from ambient air-borne toxic materials and pathogens. Such toxic materials may include nerve agents, perfluorocarbons, other gaseous toxins, pathogenic microorganisms such as anthrax, smallpox or viruses, and the like. In such applications, a personal protection apparatus such as a breathing apparatus includes a microimpactor system in which the microimpactors are made from or coated with materials that react with, bind or otherwise deactivate specific types of air-borne toxins and pathogens. Thus, the microimpactor system serves not only to capture toxic and pathogenic particles, but also to render them into a non-hazardous or less hazardous form. A wide variety of deactivating materials can be used to make or coat the microimpactors, as described above. Combinations of different deactivating materials can be used to provide protection from mixtures of toxic agents and/or pathogens. For example, some microimpactors may be coated with a deactivating agent for one specific toxin or pathogen, whereas other are coated with a different deactivating agent for some other toxin or pathogen.

Alternatively or in addition, the microimpactors may be connected with a source of electrical energy, which allows the microimpactors to become electrostatically charged and lyse or inactive the toxic or pathogenic agent. The microimpactors may be combined with an energy source that heats the microimpactors and thermally lyses or inactivates the toxin or pathogen. The high surface area of the microimpactors allows excellent heat exchange with the captured particles and the fluid, allowing for very efficient thermal lysing and deactivation reactions to occur.

In another alternative, the microimpactor surface is made from or is coated with a catalyst that catalyzes a lysing or deactivation reaction between a toxin or pathogenic agent and some other reagent. The other reagent can be supplied together with or separately from the particle-laden fluid to perform the lysing or deactivation reaction on the captured particles.

A breathing device containing the microimpactor system as described can replace or supplement conventional gas mask technology. It is also scalable to collective protection applications such as shelters.

F. Non-Particle capture applications. The microimpactor system is used in a variety of applications where a high surface area absorbent, reactive or catalytic surface is desired. The microimpactor system is particularly useful in low volume and/or in low pressure drop applications. Specific examples of such applications include:

1. Absorption. A microimpactor system having an absorbent surface effectively removes specific gasses from the fluid, through chemical affinity, electrostatic attraction or other attractive forces. As before, the microimpactors can be interrogated using various tools to detect the presence of such captured gasses, making the microimpactor system useful as a device for detecting the presence of those gasses in a fluid stream. If desired, the microimpactors may be in addition electrostatically charged and/or heated as described before to destroy or inactivate the specific gas. Further, the microimpactor containing the captured gas can be exposed to various types of chemical reagents that react with the captured gas to form a desired reaction product.

2. Catalytic oxidation. Personal protection devices for military and other applications often require that toxic gases be removed so air can be safely breathed. Certain nitrogen-containing toxic gases and agents are effectively destroyed by passing a mixture of them in an oxygen-containing atmosphere through a microimpactor system, in which the microimpactors are coated with a substance which catalyzes the thermal destruction of such compounds. A suitable such catalytic material is a platinum or palladium catalyst, which may be supported on a suitable support such as alumina. For a breathing apparatus that removes nitrogen-containing toxins and agents, catalysts that do not form $NO_x$ compounds are preferred. The microimpactor system is provided with a means to heat the microimpactors and/or the fluid conduit containing the microimpactors to a temperature at which the thermal decomposition of the toxic agent takes place. This can be accomplished, for example, by applying heat from an external flame (as would be suitable for use with small, lightweight personal protection apparatus useful in military applications, for example). Alternatively, the microimpactors may be made from an electrical resistor which generates heat when an electrical current is supplied.

Perfluorinated compounds can be catalytically destroyed in like manner, using a microimpactor system in which the microimpactors are coated with a suitable catalyst for the oxidation of such compounds.

Mixtures of toxic gases and agents can be effectively deactivated or destroyed in accordance with this invention. In one approach, this is accomplished by flowing a fluid containing the toxins through multiple microimpcator systems, arranged in series, in which each microimpactor system contains a catalytic coating that is specific for one of the toxins in the fluid. Alternatively, a single microimpactor system can be used, in which individual microimpactors within the microimpactor system are coated with the different catalysts.

3. Heat exchange. The high surface area of the microimpactor device makes it very useful as a device for removing heat from or transferring heat to a fluid. In this application, the microimpactors can be made of a thermally conductive material that allows them to efficiently transport heat away from or to the fluid. The microimpactors may be in thermal connection with an outside source of heat or cooling to augment its heat exchange function. In certain embodiments, the microimpactors are made of a resistor material, which converts an applied electrical voltage into heat for warming a fluid.

It will be appreciated that many modifications can be made to the invention as described herein without departing from the spirit thereof, the scope of which is defined by the appended claims.

What is claimed is:

1. A microimpactor system comprising a fluid conduit having a plurality of rows of microimpactors arranged in the fluid conduit substantially transverse to a main direction of flow of fluid through the fluid conduit, wherein the spacing between adjacent microimpactors within a row is from about 3 to about 20 times the microimpactor width, and the spacing between adjacent rows of microimpactors is from about 3 to about 20 times the microimpactor width.

2. The microimpactor system of claim 1, wherein microimpactors in at least two successive rows are offset from each other.

3. The microimpactor system of claim 1, wherein the fluid conduit includes a fluid inlet and a fluid outlet.

4. The microimpactor system of claim 1, wherein the microimpactor system further comprises a means for moving fluid through the system.

5. The microimpactor system of claim 1, further comprising means for applying an electrical charge to at least one microimpactor.

6. The microimpactor system of claim 1, wherein the microimpactor width is from about 10 to about 100 microns.

7. The microimpactor system of claim 6, wherein the spacing between adjacent microimpactors within a row is from about 3 to about 10 times the microimpactor width.

8. The microimpactor system of claim 7, wherein the spacing between adjacent rows of microimpactors is from about 3 to about 10 times the microimpactor width.

9. The microimpactor system of claim 8, wherein the spacing between adjacent microimpactors within a row is from about 5 to about 8 times the microimpactor width.

10. The microimpactor system of claim 9, wherein the spacing between adjacent rows of microimpactors is from about 3 to about 10 times the microimpactor width.

\* \* \* \* \*